(12) United States Patent
Chu et al.

(10) Patent No.: US 12,467,871 B2
(45) Date of Patent: Nov. 11, 2025

(54) METHODS AND APPARATUS FOR AN ANTI-COUNTERFEITING SYSTEM USING COLOR SPACE CORRELATED RAMAN SPECTROSCOPY OF DIAMOND

(71) Applicant: VERSITECH LIMITED, Hong Kong (CN)

(72) Inventors: Zhiqin Chu, Hong Kong (CN); Yau Chuen Yiu, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 292 days.

(21) Appl. No.: 18/073,227

(22) Filed: Dec. 1, 2022

(65) Prior Publication Data

US 2023/0168205 A1 Jun. 1, 2023

Related U.S. Application Data

(60) Provisional application No. 63/284,776, filed on Dec. 1, 2021.

(51) Int. Cl.
*G01N 21/87* (2006.01)
*G01N 21/65* (2006.01)

(52) U.S. Cl.
CPC .............. *G01N 21/87* (2013.01); *G01N 21/65* (2013.01); *G01N 2201/06113* (2013.01)

(58) Field of Classification Search
CPC ... H04L 63/1441; H04L 51/046; H04L 51/12; H04L 63/0254; H04L 63/0281;
(Continued)

(56) References Cited

U.S. PATENT DOCUMENTS 5,714,102 A * 2/1998 Highum .................. B32B 27/18
264/105
5,753,887 A * 5/1998 Rosenwasser .......... B44B 7/002
219/121.68
(Continued)

OTHER PUBLICATIONS

Srinivasu Kunuku, et al., "Investigation of the spectral characteristics of silicon-vacancy centers in ultrananocrystalline diamond nanostructures and single crystalline diamond," Journal of Applied Physics, (2020), 127, pp. 035302-1-035302-11.
(Continued)

*Primary Examiner* — Sharif E Ullah
(74) *Attorney, Agent, or Firm* — Leason Ellis LLP

(57) ABSTRACT

A method and system for encrypting and decrypting authentication information about a synthetic Raman diamond tag formed with predetermined defects, impurities and/or strains in its crystal structure. A sender uses an optical spectrometer to establishing authentication identities of the synthetic diamond Raman tag and the sender's nature by means of Raman scanning. The sender then encrypts information about the synthetic Raman diamond tag and the sender, and transfers the Raman tag physically to a receiver and the encrypted information electronically to the receiver. The receiver first authenticates the diamond Raman tag and second authenticates the sender's nature. The receiver decrypts the encrypted information by reverse Raman scanning only if the first and second authenticating steps are successful.

6 Claims, 7 Drawing Sheets
(7 of 7 Drawing Sheet(s) Filed in Color)

(58) Field of Classification Search
CPC . H04L 63/1433; H04L 63/20; H04L 63/1425;
H04L 63/08; H04L 63/101; H04L 63/105;
H04L 63/145; H04L 12/4625; H04L
2463/144; H04L 63/0236; H04L 9/30;
G06F 21/6245; G06F 16/9535; G06F
21/45; G06F 21/552; G06F 21/577; G06F
21/604; G06F 21/64; G06F 2221/2129;
H04W 12/02; H04W 12/03; H04W 12/04;
H04W 12/08; H04W 12/71; H04W 84/12;
G01N 21/87
USPC .......... 380/54, 255, 264, 276; 713/150, 163,
713/181; 726/2, 21, 36
See application file for complete search history.

(56) References Cited

U.S. PATENT DOCUMENTS

| | | | | |
|---|---|---|---|---|
| 5,760,367 | A * | 6/1998 | Rosenwasser | B44B 7/00 219/121.85 |
| 6,211,484 | B1 * | 4/2001 | Kaplan | B23K 26/0648 219/121.68 |
| 7,204,428 | B2 * | 4/2007 | Wilson | G06V 10/245 235/494 |
| 7,284,396 | B2 * | 10/2007 | Barron | B44F 1/06 219/121.68 |
| 7,537,877 | B2 * | 5/2009 | Yoshiba | G03G 9/0812 430/108.7 |
| 7,773,749 | B1 * | 8/2010 | Durst | G06K 19/086 380/54 |
| 8,851,372 | B2 * | 10/2014 | Zhou | H04B 1/385 455/66.1 |
| 9,239,414 | B2 * | 1/2016 | Rey | B44C 1/04 |
| 9,269,576 | B2 * | 2/2016 | Yamauchi | H01L 23/544 |
| 10,281,398 | B2 * | 5/2019 | Zheng | G01N 21/553 |
| 10,471,478 | B2 * | 11/2019 | Gil | B07C 3/14 |
| 10,603,685 | B2 * | 3/2020 | Zheng | C23C 26/00 |
| 10,620,121 | B2 * | 4/2020 | Zheng | G01N 15/14 |
| 11,074,650 | B1 * | 7/2021 | Madisetti | G06Q 20/3823 |
| 11,484,011 | B2 * | 11/2022 | Chapman | A01K 27/006 |
| 11,488,122 | B2 * | 11/2022 | Diamond | G06Q 20/10 |
| 11,514,689 | B2 * | 11/2022 | Niskanen | G01N 21/87 |
| 11,783,145 | B2 * | 10/2023 | Hakim | G06K 7/1417 235/454 |
| 2003/0120613 | A1 * | 6/2003 | Neogi | G06Q 20/401 705/75 |
| 2003/0198800 | A1 * | 10/2003 | Hoffman | H05K 9/0003 428/323 |
| 2003/0223054 | A1 * | 12/2003 | Warwick | G06K 19/06037 356/30 |
| 2004/0112087 | A1 * | 6/2004 | Bishop | G09F 3/00 63/32 |
| 2005/0121417 | A1 * | 6/2005 | Dixon | A61F 2/30767 216/88 |
| 2006/0196858 | A1 * | 9/2006 | Barron | B44F 1/06 219/121.69 |
| 2007/0092647 | A1 * | 4/2007 | Scarsbrook | C30B 29/04 427/249.5 |
| 2008/0115212 | A1 * | 5/2008 | Arias | H01M 8/04208 726/21 |
| 2010/0018955 | A1 * | 1/2010 | Martinez | G11B 7/1378 219/121.68 |
| 2010/0310839 | A1 * | 12/2010 | Rey | B44C 1/04 216/33 |
| 2012/0120465 | A1 * | 5/2012 | Martinez | G03H 1/08 219/121.2 |
| 2012/0167210 | A1 * | 6/2012 | Oro Garcia | H04L 63/101 726/22 |
| 2013/0160639 | A1 * | 6/2013 | Lee | F41H 5/013 264/603 |
| 2014/0139608 | A1 * | 5/2014 | Rosario | B23K 26/359 347/225 |
| 2015/0084193 | A1 * | 3/2015 | Feng | H01L 21/76802 257/773 |
| 2015/0213734 | A1 * | 7/2015 | Glickman | G09F 3/005 235/494 |
| 2016/0099852 | A1 * | 4/2016 | Cook | H04L 47/2425 709/224 |
| 2016/0300234 | A1 * | 10/2016 | Moss-Pultz | H04L 9/3247 |
| 2017/0009376 | A1 * | 1/2017 | Khan | C30B 25/105 |
| 2017/0196318 | A1 * | 7/2017 | Wagner | A44C 17/001 |
| 2017/0261855 | A1 * | 9/2017 | Moore | B44C 3/00 |
| 2018/0109494 | A1 * | 4/2018 | Yu | H04L 63/1441 |
| 2018/0293474 | A1 * | 10/2018 | Almog | G09C 5/00 |
| 2018/0365450 | A1 * | 12/2018 | Cheng | G06F 21/76 |
| 2019/0114698 | A1 * | 4/2019 | Lutnick | G06Q 30/0601 |
| 2019/0130100 | A1 * | 5/2019 | Dymshits | G06F 16/90335 |
| 2019/0169876 | A1 * | 6/2019 | Hennessy | G06F 21/34 |
| 2019/0355037 | A1 * | 11/2019 | Desai | G06F 16/955 |
| 2019/0378145 | A1 * | 12/2019 | Mayer | G06F 40/40 |
| 2020/0076786 | A1 * | 3/2020 | Spivack | B42D 25/328 |
| 2020/0145454 | A1 * | 5/2020 | Galliano | H04L 61/4511 |
| 2020/0246681 | A1 * | 8/2020 | Chen | G06K 7/1408 |
| 2021/0027447 | A1 * | 1/2021 | Parikh | G06F 18/22 |
| 2021/0158118 | A1 * | 5/2021 | Benderly | G01N 21/87 |
| 2021/0160235 | A1 * | 5/2021 | Lerner | H04L 9/0866 |
| 2021/0287288 | A1 * | 9/2021 | Madisetti | H04L 9/14 |
| 2021/0358004 | A1 * | 11/2021 | Chang | G06Q 30/0621 |
| 2021/0390531 | A1 * | 12/2021 | Voorhees | G06Q 20/367 |
| 2022/0254174 | A1 * | 8/2022 | Hong | G06V 10/758 |
| 2022/0376896 | A1 * | 11/2022 | Hakim | G09C 5/00 |
| 2022/0394892 | A1 * | 12/2022 | Han | H05K 9/0092 |
| 2023/0016065 | A1 * | 1/2023 | Diamond | G06Q 30/06 |
| 2023/0168206 | A1 * | 6/2023 | Hakim | G01N 21/87 356/30 |

OTHER PUBLICATIONS

Yan-Wei Hu, et al., "Flexible and Biocompatible Physical Unclonable Function Anti-Counterfeiting Label," Advanced Functional Materials, 2021, 31, 2102108, pp. 1-9.

* cited by examiner

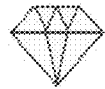
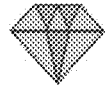
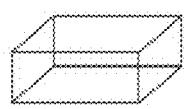
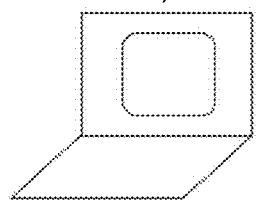
FIG. 6A
FIG. 6B
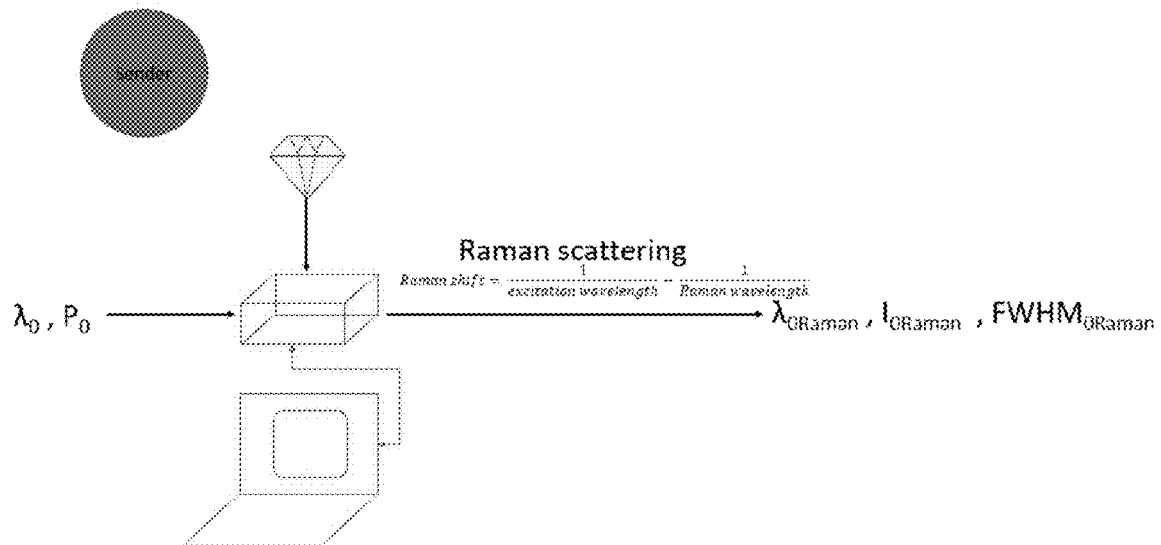
FIG. 7

METHODS AND APPARATUS FOR AN ANTI-COUNTERFEITING SYSTEM USING COLOR SPACE CORRELATED RAMAN SPECTROSCOPY OF DIAMOND

CROSS REFERENCE TO RELATED APPLICATION

The present application claims the benefit of priority to U.S. provisional patent application Ser. No. 63/284,776, filed Dec. 1, 2021, which is hereby incorporated by reference in its entirety.

FIELD OF THE INVENTION

The present invention relates to the prevention of counterfeiting and, more particularly, to the use of color space correlated Raman spectroscopy of diamonds for detecting counterfeits.

BACKGROUND OF THE INVENTION

Optical anti-counterfeiting devices, such as fluorescent marks on banknotes, flash stickers on packaging and watermarks, are everywhere. However, they are fragile and easily replicated. For instance, the fluorescent marks are made of photo-bleachable ink/dye while the flash stickers are commonly made of replicable photonic structures. Physically unclonable optical anti-counterfeiting devices are thus desirable.

Raman spectroscopy is a widely used technique in the spectroscopic study of Raman scattering for material analysis because Raman scattering is a light-matter inelastic scattering phenomenon which probes molecular vibration. Three major features including (1) Raman shift location $$(\text{Raman shift} = \frac{1}{\text{excitation wavelength}} - \frac{1}{\text{Raman wavelength}} [1]),$$

(2) Raman intensity, and (3) line width (full-width-of-maximum, FWHM) of Raman peak, can be obtained from the Raman spectrum for information about the chemical structure, the chemical quantity and the internal strain of a material, respectively. However, Raman spectroscopy is commonly used for analyzing the target materials of interest only ("first person") but it is not commonly used as anti-counterfeit for "second/third person".

A Raman signature of a synthetic diamond is a desired solution of the problem of providing a physically unclonable optical anti-counterfeiting device. Synthetic diamond is an artificial diamond that is also hard or almost impossible to remove/damage by chemical or physical means. The Raman signature of a synthetic diamond represents the local environment of the $sp^3$ carbon atoms in the crystal structure that is revealed by inelastic light-matter scattering. The Raman signature is physically unclonable because the defects/impurities/strains in the artificial diamond are randomly distributed because they are either naturally formed that way or are artificially engineered into the crystal structure of the diamond during the growth. See, J. Appl. Phys. 127, 035302 (2020); https://doi.org/10.1063/1.5123263

Producing artificial diamonds requires expensive and sophisticated micro-and-nano fabrication techniques including vacuum deposition, annealing, reactive ion etching, UV lithography, focused ion beam implanting, and also the use of toxic gases to make Raman peak features. Adv. Funct. Mater., 2102108 (2021); https://doi.org/10.1002/adfm.202102108

The prior methods for creating featured Raman peaks require the embedding of micro diamond into a biopolymer solution, spatially distributing the mixture into a film, and Raman imaging techniques.

SUMMARY OF THE INVENTION

By rationally controlling the growth of diamond with the formation of defects/impurities/strains, unclonable synthetic diamonds are synthesized. Furthermore, the expensive diamond growth machinery needed for making artificial diamonds prevents potential replicas in the market. Therefore, the Raman signature of a synthetic diamond is an optimal solution for physically unclonable optical anticounterfeiting.

In comparison to the prior art, the present invention is cost-effective and relatively safe during fabrication since only vacuum deposition is required. In particular, the present invention does not require additional chemical synthesis after the formation of the diamond. Meanwhile, the invention works well on point measurement and it does not require the development of expensive and advanced Raman imaging device for observation.

According to the present invention, a color space correlated Raman system is developed which incorporates 1) a synthetic diamond Raman tag as a physically unclonable optical anticounterfeit and 2) a joint Raman spectrometer and Raman camera as easy-to-use systems for encoding and decoding, which encoding/decoding systems form a novel cost-effective optical anti-counterfeiting system. This system carries out multi-level optical encryption (OE) and optical decryption (OD). OE is a process for encrypting information about excitation laser power, excitation laser wavelength, and a diamond sample with different randomly distributed defects/impurities/strains (varying types, concentration, etc.) into Raman intensity, Raman shift, change of Raman shift and full width at half maximum (FWHM) of the Raman signature, respectively. OD is a consecutive Raman measurement for optical decryption via a $1^{st}$ stage identification using a Raman spectrometer or Raman spectrometer sensor, and a $2^{nd}$ stage identification using an RGB detector (color scientific camera, color camera, or black-white camera coupled with a set of customized color filters).

The present invention takes advantage of the unclonable synthetic diamond Raman tag for robust anti-counterfeit labels and multi-level optical decryption for cross authentication. The advantages favour the invention for use in applying anti-counterfeit devices to luxury goods, electronic components, vehicles, and packaging.

The problems to be overcome in implementing the invention include 1) the required spatially resolved Raman imaging apparatus, 2) the complicated and cost-consuming apparatus and 3) the limited robustness of commonly used optical anti-counterfeiting labels. However, the present synthetic diamond Raman tag is non-cloneable, unlike the usual Raman tags which are made of easily replicated known chemicals. Also, synthetic diamond is not a commonly accessible material, which minimizes the chances of its being replicated. Meanwhile, synthetic diamond itself carries non-cloneable physical features because a synthetic diamond is grown from an individual diamond seed, each of which can have different crystal orientations and internal crystal structure strain. Hence, the Raman spectrum of the grown diamonds in same batch or across different batches can be different so that no known synthetic diamond Raman tag can be reproduced precisely.

The Raman apparatus of the present invention is a "zero-dimension point" measurement-based Raman camera and spectrometer. During the measurement, a laser is focused into a tiny "spot" on the diamond to probe the Raman scattering. This spot has a length, width, and depth on the order of several hundred nanometers. Hence, this spot can be treated as a zero-dimensional point unlike the usual Raman microscopes which carry out two-dimension or three-dimension spatial imaging. Since the present Raman apparatus requires zero-dimension measurement only, the operation and development are convenient compared with the prior Raman imaging techniques. As a result, the present invention enables the use of a simplified and cost-effective way to observe Raman signal. The Raman apparatus adopts regularly low-cost still optical and mechanical components for the zero-dimension observation. This differs from the prior the commercial machines available in the market that utilize complicated and expensive laser scanning or mechanical scanning mechanisms in order to conduct Raman imaging.

The synthetic diamond Raman tag of the present invention is a kind of diamond that is highly robust for an optical anticounterfeiting labels compared to the commonly used prior techniques regarding four major advantages based on its chemical properties and physical properties. First of all, the instrument and chemicals for growing diamond are extremely expensive and are also owned by a limited number of reliable manufacturers, which makes robust in a manufacturing aspect. Secondly, diamond is highly chemically inert, so that it cannot be damaged or removed by chemicals ordinarily available to the public. Thirdly, its ultimate hardness, strength and stiffness, protects it from potential physical damages such as from scratching, drilling, striking, or any kinds of mechanical contact. Lastly, diamond is optically stable without optical bleaching such that its Raman signal is long lasting. To the contrary, the commonly used optical anticounterfeiting labels do not carry the same advantages. Prior optical anticounterfeiting labels commonly rely on fluorescence ink/dye and photonic crystals which can be obtained or replicated at relatively low price compared to the synthetic diamond Raman tag of the present invention. Furthermore, fluorescence ink/dye is photo-bleachable, so they can be removed by strong light or long-term optical irradiation.

In an exemplary embodiment in Step 1 the sender establishes the authentication identities of the synthetic diamond Raman tag and the RGB code representing the sender's nature. To define the authentication identities of the synthetic diamond Raman tag, the sender measures the Raman spectrum of the synthetic diamond Raman tag with the system. The synthetic diamond Raman tag transforms the sender-predefined laser wavelength and the sender-predefined laser power into a predefined Raman shift, predefined Raman intensity, and predefined FWHM of the Raman signature of diamond via Raman scattering. To define the sender's nature, the sender remeasures the Raman spectrum of the Raman tag again, but with a set of RGB filters which are arbitrarily chosen to represent the sender. These RGB codes are shared between the sender and the receiver.

During operation, a laser beam is reflected from a dichroic mirror and is focused onto a CVD or HPHT synthetic diamond by an objective lens. The backscattered Raman light is collected by the same objective lens and passes through the same dichroic mirror to a laser filter so only backscattered Raman light is collected by the detectors. After exiting the laser filter the back scattered light may encounter arbitrarily chosen RGB filters, which represent a set of customized red (R), blue (B), and green (G) filters. The RGB filters are used when a color space correlated Raman spectrum is measured.

The operation of the encryption and decryption has the following steps:
Step 1. Establish the authentication identities of the synthetic diamond Raman tag and sender's nature by sender
Step 2. Encrypt information to be sent by sender
Step 3. Transfer Raman tag, encrypted information, and authentication identities to receiver by sender
Step 4. Authenticate sender's nature and diamond Raman tag by receiver
Step 5. Decrypt information by receiver The result is a two-step authentication (diamond Raman tag and RGB filter definitions) for a hard to clone optical anti-counterfeiting device.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The foregoing and other objects and advantages of the present invention will become more apparent when considered in connection with the following detailed description and appended drawings in which like designations denote like elements in the various views, and wherein:

FIG. 6A is an illustration of a sender defined synthetic diamond Raman tag with arbitrarily chosen RGB filters, FIG. 6B is an illustration of a fake Raman tag with fake RGB filters/instruments pretending to originate with the sender;

FIG. 7 is an arrangement for the sender establishing the authentication of the identity of a synthetic diamond Raman tag;

DETAILED DESCRIPTION

The invention is anticounterfeit system in the form of a color space correlated Raman spectrum. The color space correlated Raman spectrum is comprised of a material, an instrument, and an operational methodology. The material is a Raman tag, which is a substance exhibiting the Raman scattering.

The Raman tag is any kind of synthetic diamond which carries physically unclonable randomly distributed defects/impurities/strains created during its growth in the way of either natural formation or artificially engineered formations in the crystal structure. As an example, the material can be synthetic diamond made by a chemical vapor deposition (CVD) process or a high-pressure high-temperature (HPHT) process.

The instrument is a joint Raman spectrometer and Raman camera, which are easy-to-use systems. The spectrometer is used for spatially separating light while the camera is used for recording the light intensity of the spatially separated light. A Raman spectrum provides four major pieces of information, i.e.: (1) Raman shift (the peak location), which indicates a specific molecular vibrational pattern and molecular bonding; (2) Change of the Raman shift (the peak shift), which indicates the internal strain of the chemical structure; (3) FWHM (peak width, the Raman signal spread in color), which indicates the crystallinity of the chemical structure; and (4) Raman intensity (peak height), which indicates the amount of the specific molecular vibrational pattern and molecular bonding.

However, Raman scattered light is spatially mixed with the back scattered excitation laser light during the measurement. See FIG. 1. The back scattered excitation laser light is a strong background for the Raman scattered light, and the mixed signal prevents the recording a specific Raman signal. In order to record a specific Raman scattered light signal, the spectrometer is used to spatially separate the light into specific spaced locations depending on the light color, just like a rainbow or a rainbow created by CD, VCD, and DVD.

After spatial separation, a camera records the light intensity by its spatially distributed sensor pixels. Each single pixel of the camera sensor represents a single wavelength (color) with respect to the light separation processed by the spectrometer. The same working principle works on:
  Case 1: Traditional scientific spectrometer and scientific camera
  Case 2: Spectrometer sensor
  Case 3: Raman camera Red, green and blue color filters transform the recorded Raman signal into R, G, and B components in analogy to the RGB values provided by a conventional RGB color camera. The color filters have their own transmission profile working in the red, green and blue color range. The color filters adjust the Raman signal intensity into 3 components by the specific transmission abilities of the RGB filters. The camera does not produce images, it only records light intensity.

Figure 1:
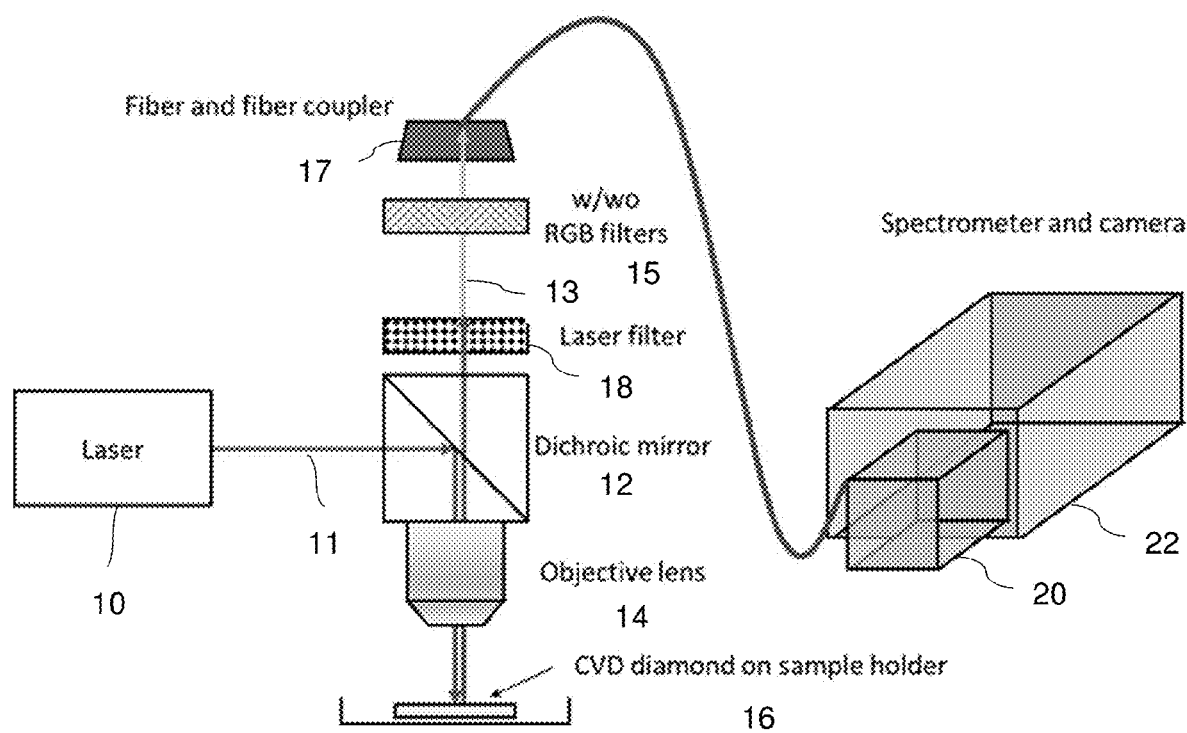
FIG. 1 is a diagram of a Raman dispersive spectrometer in a fiber detection configuration.
Figure 2:
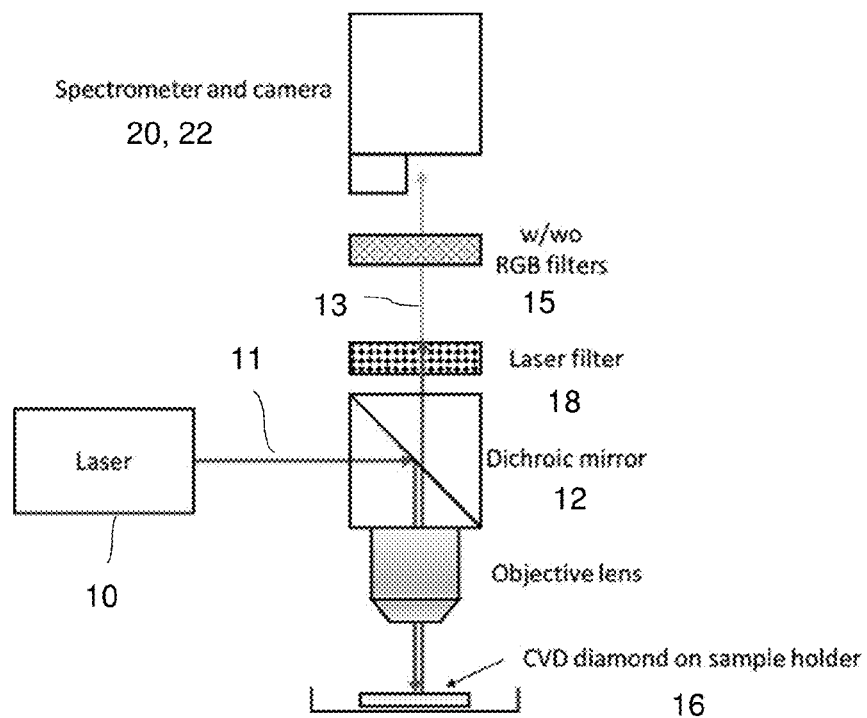
FIG. 2 is a diagram of a Raman dispersive spectrometer in an open space detection configuration.

The present invention has a two-stage identification process. The Raman spectrometer is responsible for the 1st stage identification using a Raman spectrum for investigation of the Raman intensity, Raman shift and the full-width of half-maximum (FWHM) of the Raman signature of the Raman tag. The Raman spectrometer can be a conventional scientific camera coupled spectrometer or a standalone spectrometer sensor. It can be operated in a fiber detection configuration as shown in FIG. 1 or an open space detection configuration as shown in FIG. 2. The instrument can be operated in reflection or transmission configurations.

The Raman camera is responsible for 2nd stage identification using color filter truncated Raman spectra for color space correlated Raman signature authentication. The Raman camera can be a color scientific camera, color camera, or black-white camera coupled with a set of customized color filters.

During operation, a light beam 11 from a laser 10 is reflected from a dichroic mirror 12 and is focused onto a CVD or HPHT synthetic diamond 16 by an objective lens 14. The backscattered Raman light 13 is collected by the same objective lens 14 and passes through the same dichroic mirror 12. In effect, the dichroic mirror can reflect laser toward the CVD or HPHT diamond at the same time it is transmitting the Raman back scattered light. This back scattered laser light 13 is filtered by a laser filter 18 so only backscattered Raman light can be collected by the detectors.

Figure 3:
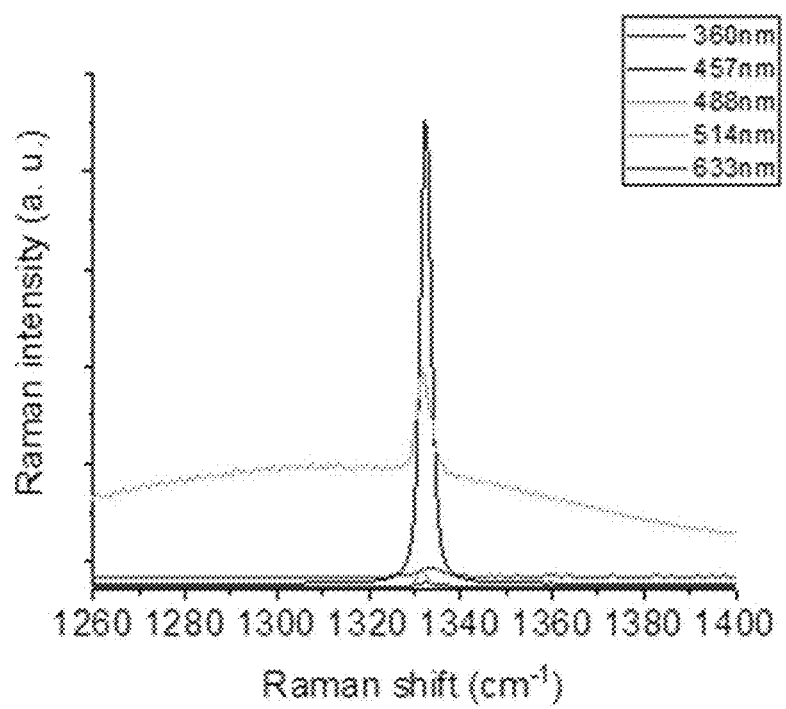
FIG. 3 is a graph of the Raman spectra of a CVD synthetic diamond measured with different excitation lasers.

The objective lens 14 can be a reflective objective lens or a refractive objective lens. The objective lens can also be a simple transmission lens. The laser beam can be of any wavelength that can induced detectable Raman scattered light for the system. As an example, a Raman spectra of a CVD synthetic diamond is measured by the setup of the present invention using purple (360 nm), blue (457 nm), green blue (488 nm), green (514 nm) or red (633 nm) lasers as excitation light are shown in FIG. 3. In effect FIG. 3 shows the Raman spectra of a CVD synthetic diamond measured with different color excitation lasers.

Figure 4:
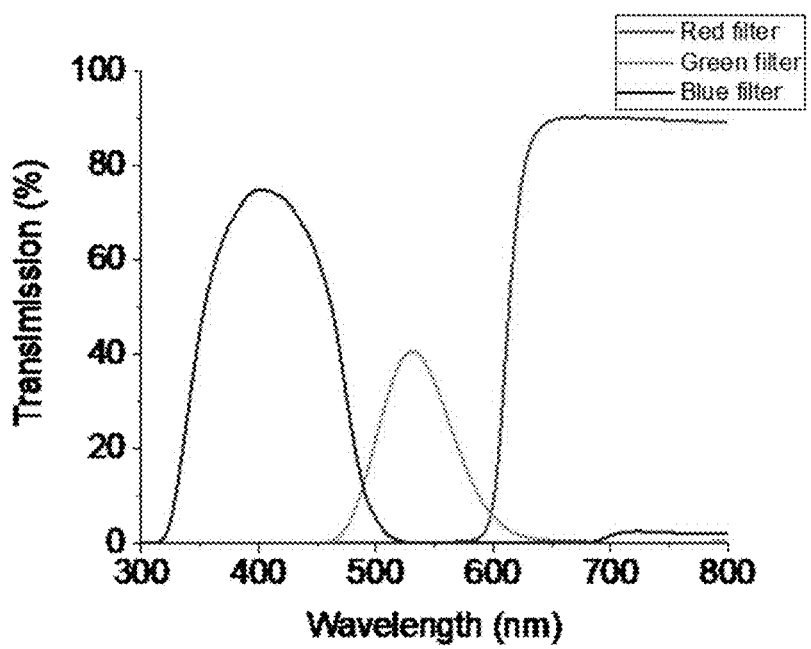
FIG. 4 is a graph of the transmission spectra of a set of arbitrarily chosen RGB filters.

After exiting the laser filter 18 the back scattered light 13 may encounter RGB filters 15, which represent a set of customized red (R), blue (B), and green (G) filters. The RGB filters 15 are used when a color space correlated Raman spectrum is measured. The RGB filters are arbitrarily chosen. An example of transmission spectra of a set of arbitrarily chosen RGB filters is shown in FIG. 4.

Figure 5:
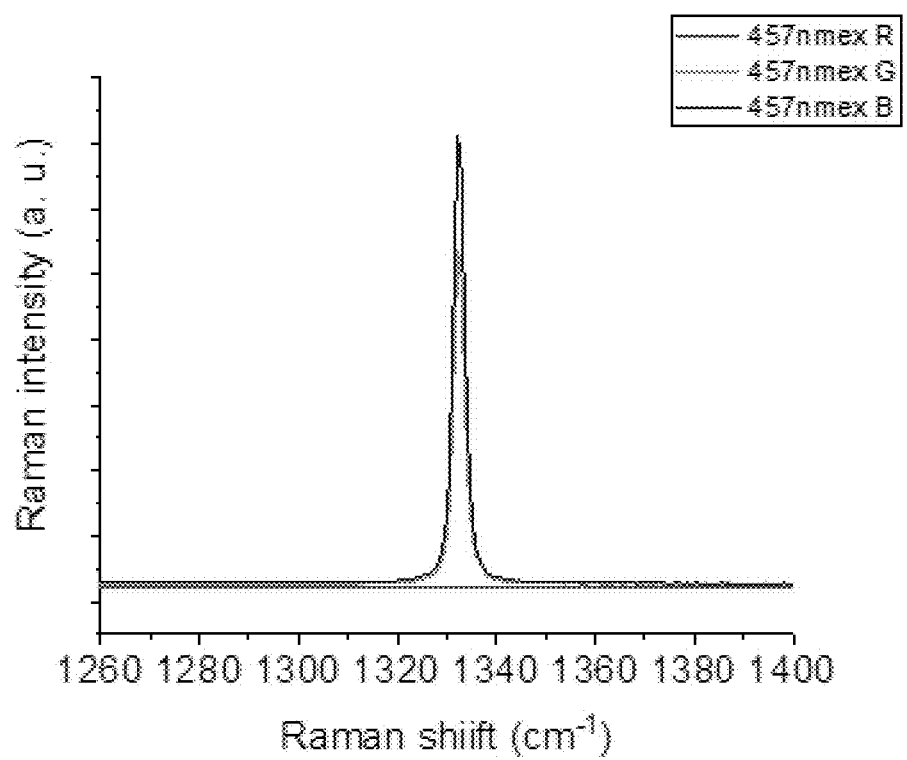
FIG. 5 is a graph of red (R), blue (B), and green (G) components of a color space correlated Raman spectra of CVD synthetic diamond measured by the invented setup using blue (457 nm) as excitation light.

In one embodiment the color space correlated Raman spectra of CVD or HPHT synthetic diamond measured by the setup of the present invention may use blue light (457 nm) as the excitation light, which is decomposed into red (R), blue (B) and green (G) components as shown in FIG. 5, which shows the color space correlated Raman spectra of CVD or HPHT synthetic diamond measured by the setup of the present invention. The collected color space correlated Raman spectra of the CVD or HPHT synthetic diamond are finally transformed by computer program to color space representation. See FIG. 6B. The color space representation can be RGB, HSL, or any customized forms.

As shown in the configuration of FIG. 1 the backscattered beam is picked up by a fiber coupler and fiber 17. The fiber directs the backscatter light to the spectrometer and camera combination 20, 22 (fiber detection configuration). In the configuration of FIG. 2 the backscatter light passes directly into the spectrometer and camera combination 20, 22 without the use of a fiber (i.e., open space detection). The spectrometer 20 provides the spectra of the received light by separating it into different locations based on color. The camera records the parameters of the spectra, which information is used in the authentication process.

The simple and easy-to-use Raman spectroscopy based multi-level anticounterfeit system uses the synthetic diamond on the first level of anticounterfeit protection while the arbitrary RGB color filters serve on the second level of anticounterfeit protection. The synthetic diamond Raman tag performs the role of an encryption key and a decryption key simultaneously. This synthetic diamond key has specific intrinsic Raman properties generated by controlling the growth parameters, such as the purity of starting carbon materials, the type of impurities, the number of impurities, the location of impurities, the growth rate, the temperature and the pressure. Therefore, a unique unclonable synthetic diamond Raman tag can be fabricated by adjusting those parameters.

The arbitrarily chosen RGB color filters perform the role of a user validation key. These filters are user pre-defined between the sender and receiver. They encrypt the synthetic diamond Raman tag into a sender identification code which enables the receiver to verify the source of information. In short, the encryption and decryption procedure of the present invention can be classified into 5 steps:

Step 1. Establishment by the sender of the authentication identities of the synthetic diamond Raman tag and the RGB codes representing the sender's nature Step 2. The sender encrypts the information to be sent Step 3. The sender transfers the Raman tag, encrypted information, and authentication identities to the receiver Step 4. The receiver authenticates the sender's nature and diamond Raman tag Step 5. The receiver decrypts the information In carrying out Step 1 the sender establishes the authentication identities of the synthetic diamond Raman tag and the RGB code representing the sender's nature. To define the authentication identities of the synthetic diamond Raman tag, the sender measures the Raman spectrum of the synthetic diamond Raman tag with the system. The synthetic diamond Raman tag transforms the sender-predefined laser wavelength and the sender-predefined laser power into a predefined Raman shift, predefined Raman intensity and predefined FWHM of the Raman signature of diamond via Raman scattering. The Raman information obtained is treated as an internal standard indicating a valid synthetic diamond Raman tag. To define the sender or the sender's nature, the sender remeasures the Raman spectrum of the Raman tag again, but with a set of RGB filters which are arbitrarily chosen to represent the sender. These RGB codes are shared between the sender and the receiver. These filters truncate the valid Raman spectrum into a color space representation that is unique to a sender and receiver. Thus, this helps the receiver to verify the sender's nature before starting decryption.

In Step 2, the sender encrypts information (laser wavelength and laser power) to be sent by the sender by measuring the Raman spectrum of the synthetic diamond Raman tag with the system. This information is then transformed into Raman intensity, Raman shift, change of Raman shift, Raman intensity and FWHM of the Raman signature.

In Step 3 the synthetic diamond Raman tag and encrypted information are delivered to the receiver by sender. Among them, the synthetic diamond Raman tag is delivered to the receiver by a physical method, i.e., the diamond tag is physically passed from the sender to the receiver, while the sender-predefined laser wavelength, the sender-predefined laser power, the internal standard, the encrypted sender's nature and the encrypted information are sent by an electronic transmission method. The sent information has different levels of visibility. The sender-predefined laser wavelength and laser power are immediately visible to the receiver for Step 4a of decryption, while the internal standard in Step 1 and the color space representation of the internal standard are hidden. They are not exposed until the required answers for Step 4a decryption and Step 4b decryption are provided, respectively. Lastly, the encrypted information is sent only in the last stage of decryption.

According to Step 4, authentication of the synthetic diamond Raman tag and the sender's nature are required to be carried out in the following order: 1) synthetic diamond Raman tag and then 2) sender's nature. To authenticate the synthetic diamond Raman tag, the receiver is required to create the Raman spectrum with the given Raman tag as well as the sender-predefined laser wavelength and the sender-predefined laser power. If the receiver determines it has a valid Raman tag in hand because of the created Raman spectrum, the receiver will produce the right answer for Step 4a so it can pass to Step 4b. Otherwise, the program will terminate itself, not going to the next step. In next step, the receiver is required to authenticate the sender's nature. To do so, the receiver is required to use the Raman spectrum in color space mode with the RGB filters it has. If the receiver gets a valid color space representation, the receiver will get the right answer so it passes Step 4b. Otherwise, the program will terminate itself, not going to the next step again. The receiver can only proceed to final Step 5 when Steps 4a and 4b are passed in an orderly process without any incorrect answers.

In final step 5 the receiver is at the last stage of decryption and it can finally read the encrypted information. In order to complete decryption, the receiver is required to conduct reverse Raman scattering with the received Raman tag by doing a laser wavelength scan and laser power scan. Once the receiver has achieved the correct laser wavelength and laser power, which leads to an output of Raman shift, Raman intensity and FWHM of the Raman signature matching with the encrypted information, the receiver has successfully obtained the original information.

A further explanation of the encryption and decryption processes of the present invention are illustrated in FIG. 6A and FIG. 6B. In FIG. 6A the sender defines a synthetic diamond Raman tag and arbitrarily choses RGB filters. The receiver is sent a fake Raman tag from the sender. Using the fake Raman tag with the agreed upon fake RGB filters, the receiver can carry out Steps 4 and 5 to decrypt the tag and get the original information.

Required laser wavelength and laser power for the authentication method for verifying the sender's nature and valid encryption/decryption key are as follows:

$$\lambda_0, P_0$$

The Encrypted Raman wavelength, Raman intensity and FWHM of the Raman peak as authentication features of valid encryption/decryption key are defined by the sender and are represented as $$\lambda_{0Raman}, I_{0Raman}, FWHM_{0Raman}$$

The RGB filters truncated encrypted Raman wavelength, Raman intensity and FWHM of Raman peak as an authentication feature of the sender's nature are defined by sender and are represented as $$R_{0Raman}, G_{0Raman}, B_{0Raman}$$

The laser wavelength and laser power are information encrypted by the sender and are represented as $$\lambda, P$$

The encrypted information is represented as $$\lambda_{Raman}, I_{Raman}, FWHM_{Raman}$$

$R_{fake\,Raman}, G_{fake\,Raman}, B_{fake\,Raman}$    RGB feature of fake RGB filters Different from $R_{0Raman}, G_{0Raman}, B_{0Raman}$ -continued

Figure 8:
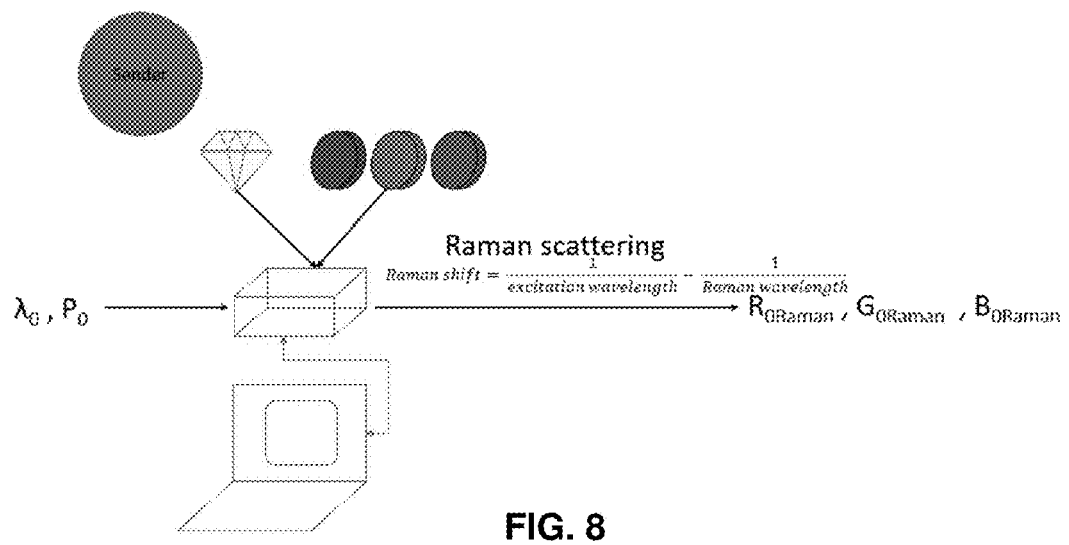
FIG. 8 is an arrangement for the sender establishing the authentication identity of sender.
Figure 9:
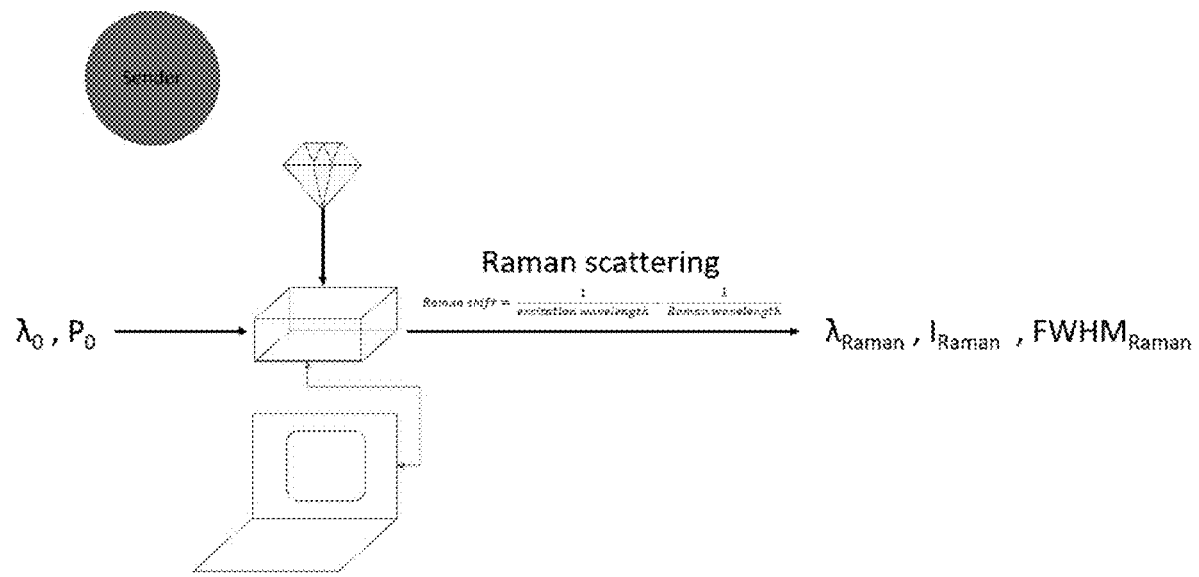
FIG. 9 is an arrangement for establishing encrypt information to be sent by a sender.

The operation of the encryption and decryption can be further explained with reference to FIGS. 7-13. This operation follows the following steps:
    Step 1. Establish the authentication identities of the synthetic diamond Raman tag and sender's nature by sender
    Step 2. Encrypt information to be sent by sender
    Step 3. Transfer Raman tag, encrypted information, and authentication identities to receiver by sender
    Step 4. Authenticate sender's nature and diamond Raman tag by receiver
    Step 5. Decrypt information by receiver FIG. 7 shows the step of the sender establishing the authentication identities of the synthetic diamond Raman tag by means of Raman scattering. FIG. 8 shows the step of the sender establishing the authentication identity of the sender or sender's nature by means of RGB filters coupled with Raman scattering. FIG. 9 shows encryption information to be sent by the sender.

Figure 10:
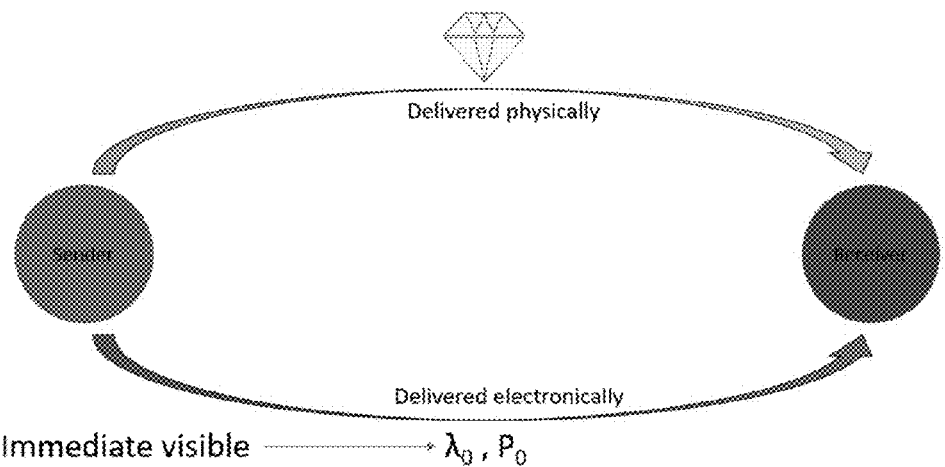
FIG. 10 is a diagram showing a transfer of Raman tag, encrypted information, and authentication identities to a receiver by sender.
Figure 11:
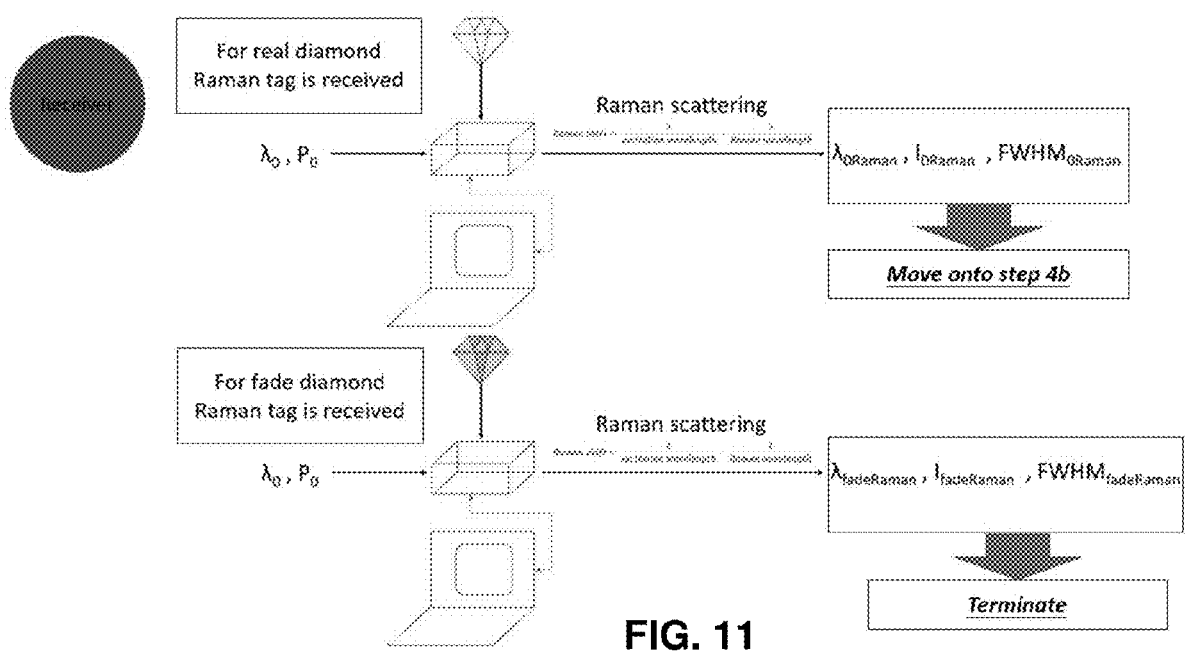
FIG. 11 is an arrangement for the receiver establishing the authentication of a synthetic diamond Raman tag.

FIG. 10 shows the sender transferring the Raman tag physically and the encrypted information electronically to the receiver. As noted above, some of the information is hidden. In particular,
    Hidden required answer for step 4a: $\lambda_{0Raman}$, $I_{0Raman}$, $FWHM_{0Raman}$
    Hidden required answer for step 4b: $R_{0Raman}$, $G_{0Raman}$, $B_{0Raman}$
    Hints shown in step 5: $\lambda_{Raman}$, $I_{Raman}$, $FWHM_{Raman}$ FIG. 11 shows Step 4a ($1^{st}$ Step of authentication) where the receiver authenticates the synthetic diamond Raman tag and the sender's nature. If the receiver gets the real diamond Raman tag and subjects it to Raman scattering, the correct result will be obtained and the process moves on to Step 4b. However, if a fake diamond Raman tag is received and is subjected to Raman scattering, the wrong result is achieved and the process is terminated.

Figure 12:
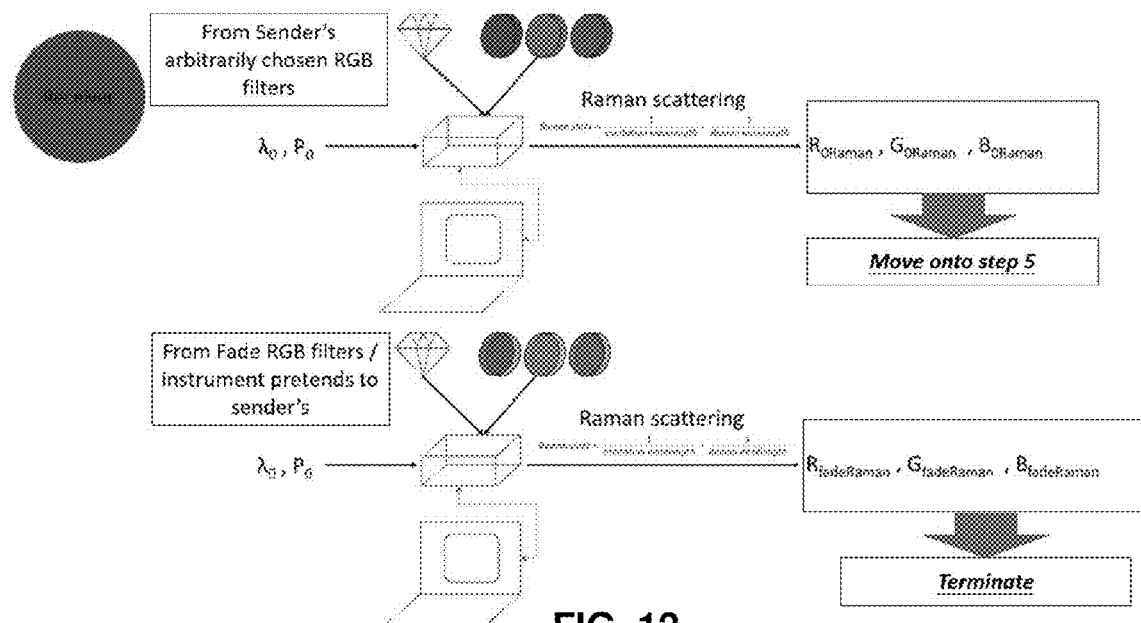
FIG. 12 is an arrangement for the receiver establishing the authentication of the sender.

As shown in FIG. 12 the system carries out Step 4b ($2^{nd}$ Step of authentication). Here the receiver gets the Sender's arbitrarily chosen RGB filter information and takes the Raman spectrum in color space mode with the RGB filters it already has. If the sender's nature is correctly determined, the process moves to Step 5. If the correct answer is not obtained, e.g., because fake RGB filters are sent pretending to be the real sender, the process terminates.

Figure 13:
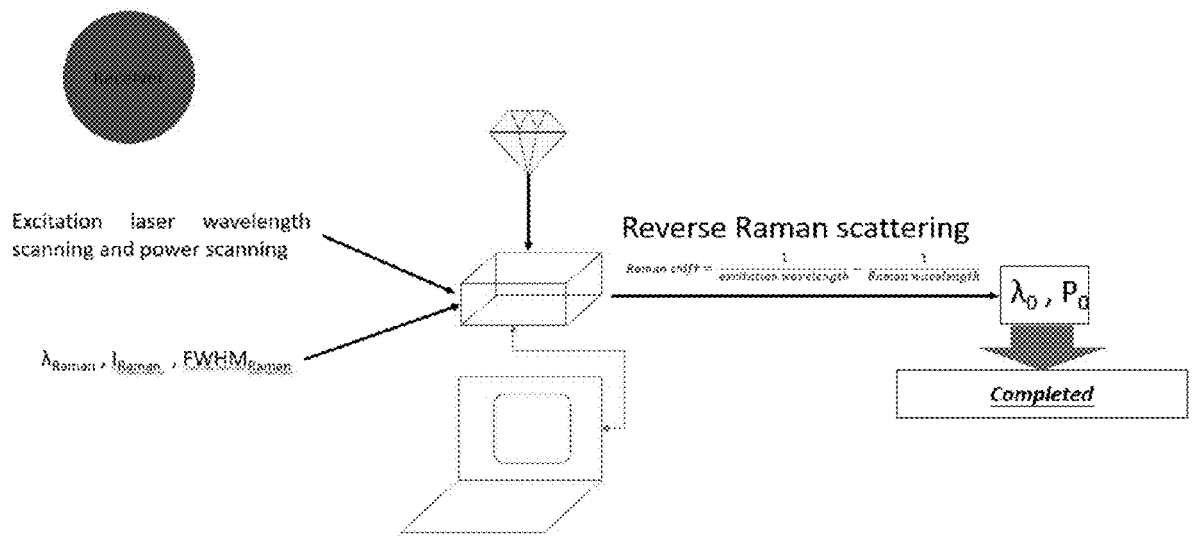
FIG. 13 is an arrangement for the receiver sending of decrypt information.

FIG. 13 shows the execution of Step 5, i.e., the decryption of the information by the receiver. In FIG. 13 the excitation laser wavelength, scanning and power are used for reverse Raman scattering of the received Raman tag. The result is the original information and the termination of the process.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An optical anti-counterfeiting system comprising:
    a synthetic diamond Raman tag formed with predetermined defects, impurities and/or strains in its crystal structure;
    an arbitrarily chosen set of red, green, blue color model ("RGB") filters that represent a sender-receiver combination shared between the sender and a receiver;
    a sender Raman dispersive spectrometer at a sender that first measures a Raman spectrum of the synthetic diamond Raman tag to transform a sender-predefined laser wavelength and a sender-predefined laser power into a predefined Raman shift, predefined Raman intensity and predefined full-width-of-maximum ("FWHM") of a Raman signature of the synthetic diamond Raman tag via Raman scattering so as to form an internal standard indicating a valid synthetic diamond Raman tag, and second remeasures the Raman spectrum of the synthetic diamond Raman tag again, but with the set of RGB filters to truncate the valid Raman spectrum into a color space representation uniquely authenticating the identity of the sender;
    an encryption device for encrypting the sender pre-defined laser wavelength, and sender predefined laser power;
    a transmission means for electronically transmitting from the sender to the receiver the encrypted sender-predefined laser wavelength and sender-predefined laser power as well as the predefined Raman shift, predefined Raman intensity and predefined FWHM of the Raman signature of the synthetic diamond Raman tag, and the color space representation; and
    a receiver Raman dispersive spectrometer at the receiver that creates a Raman spectrum with the synthetic diamond Raman tag as well as the sender-predefined laser wavelength and the sender-predefined laser power, only if the Raman spectrum matches the internal standard does the receiver Raman dispersive spectrometer then use the Raman spectrum in color space mode with the shared RGB filters, and only if it matches a valid color space representation, then the excitation laser wavelength, scanning and power are used for applying reverse Raman scattering to the received synthetic diamond Raman tag to decrypt the encrypted information of the original Raman shift, Raman intensity and FWHM of the Raman signature and authenticate the synthetic diamond Raman tag.

2. The optical anti-counterfeiting system of claim 1 wherein the synthetic Raman diamond tag is formed by a CVD process or HPHT process so as to naturally have the defects, impurities and/or strains or to have them engineered into its crystal structure.

3. The optical anti-counterfeiting system of claim 1 wherein the reverse Raman scattering with the received synthetic diamond Ramen tag is achieved by a laser wavelength scan and a laser power scan.

4. The optical anti-counterfeiting system of claim 1 wherein the encrypted information is sent only during the decryption stage.

5. A method of encrypting and decrypting authentication information about a synthetic diamond Raman tag formed with at least one of predetermined defects, impurities and strains in its crystal structure, comprising the steps of:
    a sender of a synthetic diamond Raman tag establishing authentication identities of the synthetic diamond Raman tag and a sender's nature by means of Raman scanning;
    the sender encrypting information about the synthetic diamond Raman tag and the sender;
    the sender transferring the diamond Raman tag physically to a receiver and the encrypted information electronically to receiver;

the receiver first authenticating the diamond Raman tag and second authenticating the sender's nature; and the receiver decrypting the encrypted information by reverse Raman scanning only if the first and second authenticating steps are successful.

6. The method of encrypting and decrypting authentication information according to claim 5 wherein the encrypted information is only sent after the first and second authenticating steps are successful.

\* \* \* \* \*